United States Patent [19]

Rappas et al.

[11] 4,423,014

[45] Dec. 27, 1983

[54] SOLVENT EXTRACTION

[75] Inventors: Alkis S. Rappas, Chagrin Falls, Ohio; Lloyd R. Allen, Belmont, Mass.

[73] Assignee: Cabot Corporation, Kokomo, Ind.

[21] Appl. No.: 226,977

[22] Filed: Jan. 21, 1981

[51] Int. Cl.³ .................. C22B 23/04; C01G 51/00
[52] U.S. Cl. ........................... 423/139; 75/101 BE; 75/119; 423/DIG. 14
[58] Field of Search .............. 423/139, DIG. 14; 75/101 BE, 119

[56] References Cited

U.S. PATENT DOCUMENTS

| | | | |
|---|---|---|---|
| 2,882,123 | 4/1959 | Long | 23/145 |
| 2,894,827 | 7/1959 | Hyde et al. | 23/312 |
| 2,899,451 | 8/1959 | Neville | 260/429.1 |
| 2,963,343 | 12/1960 | Pilloton et al. | 23/23 |
| 3,069,231 | 12/1962 | Hard et al. | 75/108 |
| 3,193,381 | 7/1965 | George et al. | 75/108 |
| 3,194,652 | 7/1965 | Clifford et al. | 75/119 |
| 3,294,494 | 12/1966 | Moore | 23/340 |
| 3,622,269 | 9/1969 | Yamamura et al. | 23/87 R |
| 3,758,566 | 9/1973 | Organ | 423/139 |
| 3,795,727 | 3/1974 | Yamamura et al. | 423/70 |
| 3,988,224 | 10/1976 | Barriere | 423/139 |

Primary Examiner—Edward J. Meros
Assistant Examiner—Robert L. Stoll
Attorney, Agent, or Firm—Jack Schuman; Robert F. Dropkin

[57] ABSTRACT

A pregnant liquor is mixed with an organic mixture comprised of an organic extracting agent and iso-butyl-heptyl ketone. Metallic values are absorbed from the pregnant liquor by the organic mixture. The metal-bearing organic mixture is then separated from the liquor and stripped of its metallic values.

2 Claims, 4 Drawing Figures

SOLVENT EXTRACTION

The present invention relates to the extraction of metallic values from a pregnant liquor.

Extraction of metals from pregnant liquors is achieved by mixing the pregnant liquor with an organic extracting agent and a diluent system. Typical extracting agents are organic amines, organic derivatives of phosphoric acid, other organic acids and oximes. The diluent system typically includes a substance such as kerosene or aromatic solvents; and very often, a "modifier" such as decanol or 2-ethyl-hexanol, to inhibit the formation of undesirable third phases. The undesirable third phases are neither soluble in the liquor nor the extracting agent. They tie up both reactants and to be extracted metal. Decanol, 2-ethyl-hexanol and other "modifiers" help solubilize the substances.

Through the present invention, it has been determined that iso-butyl-heptyl ketone can be used as the diluent, and the sole diluent, in solvent extraction systems, and when it is so used, a third phase inhibitor is not needed. Although other ketones have been used in solvent extraction systems, they do not have the unique properties of iso-butyl-heptyl ketone. In addition to eliminating the need for a third phase inhibitor iso-butyl-heptyl ketone is also beneficially characterized by being neither toxic nor carcenogenic, highly insoluble in water (less than 0.01%), of low viscosity, of low surface tension, easily separable from water, of high boiling point, of high flash point and of low vapor pressure. Other ketones are, for example, very viscous and substantially more soluble in water. U.S. Pat. Nos. 2,882,123; 2,894,827; 2,899,451; 2,963,343; 3,069,231; 3,193,381; 3,194,652; 3,294,494; 3,622,269 and 3,795,727 disclose the use of several diluents, including ketones, in solvent extraction systems. None of them disclose the use of iso-butyl-heptyl ketone.

It is accordingly an object of the subject invention to provide an improved diluent for solvent extraction systems and, in turn, an improved process for extracting metallic values from a pregnant liquor.

The following and other objects of the subject invention will be best understood from the following description, reference being had to the accompanying drawings wherein.

Figure 3:
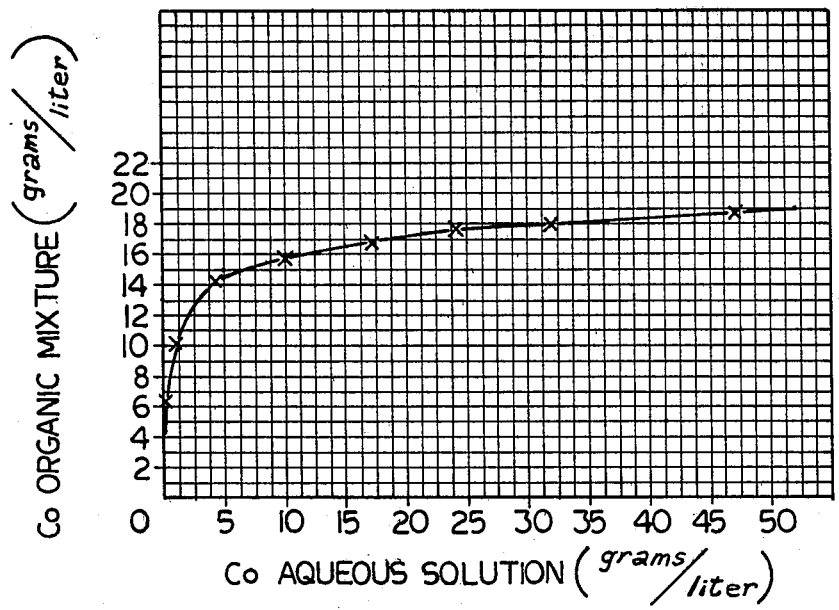
Figure 4:
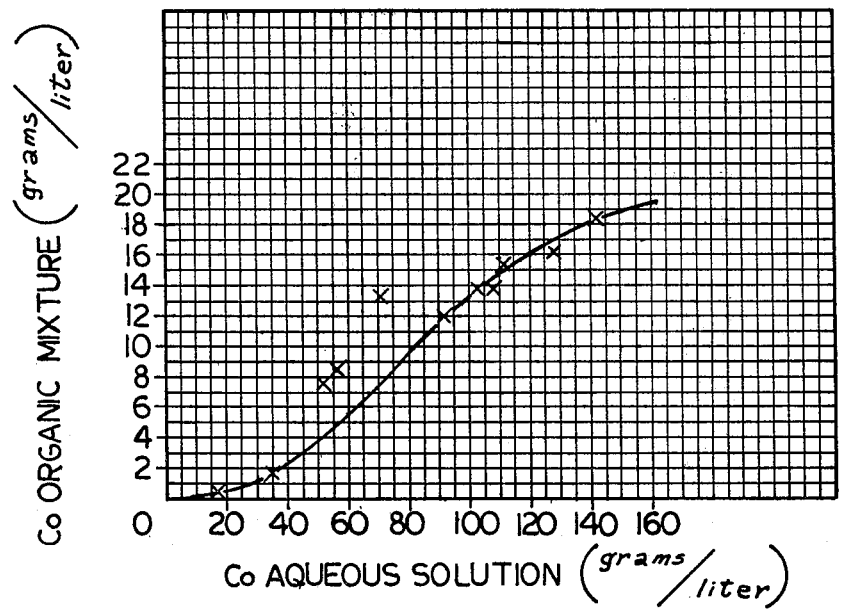

FIG. 3 is a plot of an equilibrium curve for Co extraction with an organic mixture containing 40 volume % of an organic amine sold under the trademark ALAMINE 336 (ALAMINE is a registered trademark of General Mills, Inc.) and 60 volume % iso-butyl-heptyl ketone; and FIG. 4 is a plot of an equilibrium curve for Co stripping from an organic mixture containing 40 volume % of said organic amine sold under the trademark ALAMINE 336 and 60 volume % iso-butyl-heptyl ketone.

In accordance with the present invention, a pregnant liquor is mixed with an organic mixture comprised of an organic extracting agent and iso-butyl-heptyl ketone. Metallic values are absorbed from the pregnant liquor by the organic mixture. The metal-bearing organic mixture is then separated from the liquor and stripped of its metallic values.

The extracting agent is substantially insoluble in the pregnant liquor. Typical extracting agents are organic amines, organic derivatives of phosphoric acid, other organic acids and oximes. Organic derivatives of phosphoric acid have, for example, been used to extract iron. Organic amines have, for example, been used to extract cobalt.

As the relative proportion between extracting agent and iso-butyl-heptyl ketone is dependent upon several variables including the particular extracting agent, the nature of the pregnant liquor and the metal to be extracted, the relative proportions of the substances cannot be precisely set forth. It is sufficient to state that both constituents are necessary. The process would be intolerably inefficient with just iso-butyl-heptyl ketone despite the fact that iso-butyl-heptyl ketone can in certain instances serve as an extractant. Without iso-butyl-heptyl ketone, the extracting agent would be unworkable. It would be present as a thick gel. Most situations call for at least 10% iso-butyl-heptyl ketone. Levels are generally in excess of 30%.

The use of iso-butyl-heptyl ketone eliminates the need for a third phase inhibitor. Iso-butyl-heptyl ketone is also beneficially characterized by being neither toxic nor carcenogenic, highly insoluble in water (less than 0.01%), of low viscosity, of low surface tension, easily separable from water, of high boiling point, of high flash point and of low vapor pressure. Molecules which are essentially the same as the iso-butyl-heptyl ketone molecule, that is substances characterized by only small changes in the arrangement of the molecule, are within the scope of the invention. Iso-butyl-heptyl ketone is specified as it is commercially available. The desirable characteristics thereof would in all probability be retained with minor modifications.

The metal-bearing organic mixture is preferably separated from the liquor by skimming the organic mixture therefrom. The organic mixture is lighter than and substantially insoluble in the liquor.

The metallic value is generally stripped from the metal-bearing organic mixture by mixing the organic mixture with water. Alkaline or acidic stripping agents can also be used.

In practice, the invention will usually involve a series of extracting and separating operations and a series of stripping and separating operations. The pregnant liquor is mixed with the organic extracting agent and iso-butyl-heptyl ketone, separated therefrom and mixed again with a fresh batch of organic extracting agent and iso-butyl-heptyl ketone, separated therefrom, etc. The metal-bearing organic mixture is stripped by mixing it with stripping solution, separating it from the stripping solution, remixing, reseparating, etc. A series of two or three extracting and separating and two or three stripping and separating operations should be sufficient. In certain instances it will be desirable to adjust the chemistry of the pregnant liquor prior to extracting. Adjustments are made to give the pregnant liquor a make-up suitable for formation of the to-be-extracted metallic complexes. For the removal of iron$^{+3}$ by tributyl phosphate and cobalt by an organic amine sold under the trademark ALAMINE 336, it is often desirable to add chloride ions. Conversely, these organic mixtures are stripped with solutions having a low chloride ion level. Nitrates and sulfates are additions for other systems.

Although the process is not dependent upon a particular temperature or pH of the pregnant liquor, the temperature is generally between 10° and 70° C. and preferably between 30° and 50° C. For cobalt and iron extraction the pH is generally less than 4. Stripping solutions are likewise, generally between 10° and 70° C. and preferably between 30° and 50° C. The volume ratio of pregnant liquor to organic mixture (extracting agent and iso-butyl-heptyl ketone) is a broad one. As with temperature and pH, it is in part dependent upon the nature of the pregnant liquor, the metal to be extracted and the particular extracting agent.

The following examples are illustrative of several aspects of the invention.

EXAMPLE I

Figure 1:
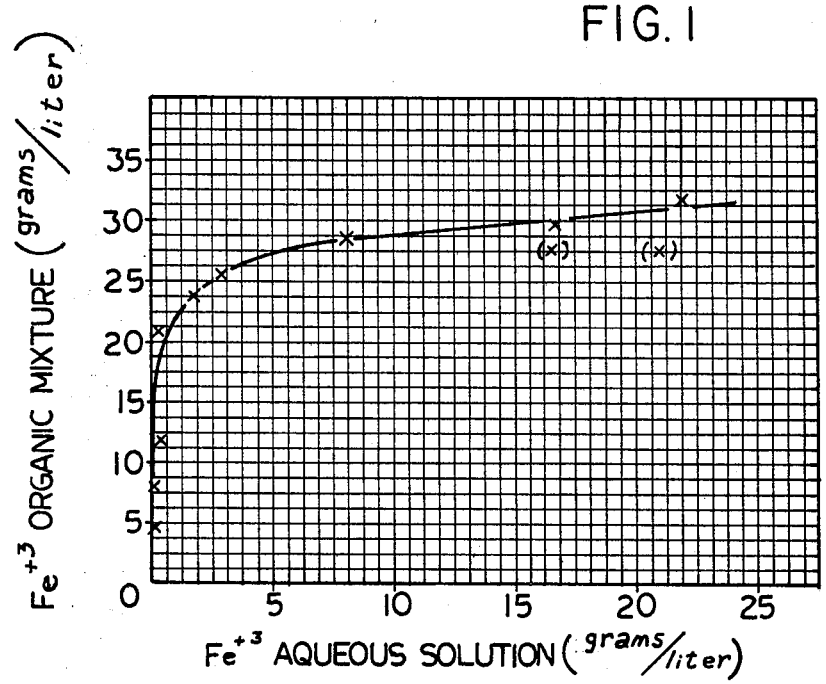
FIG. 1 is a plot of an equilibrium curve for $Fe^{+3}$ extraction with an organic mixture containing 40 volume % tributyl phosphate and 60 volume % iso-butyl-heptyl ketone.

Aqueous solutions containing 120 grams/liter nickel, 15 grams/liter cobalt and various amounts of iron and calcium were mixed with an organic mixture containing 40 volume % tributyl phosphate and 60 volume % iso-butyl-heptyl ketone, in a ratio of 5 parts aqueous solution to 1 part organic mixture to extract iron therefrom. The temperature and pH of the solutions were respectively 40° C. and 0.4. The chloride ion concentration of the solutions was initially 240 grams/liter. The concentration of iron remaining in the aqueous solution after mixing is shown in FIG. 1 along with the equilibrium concentration of iron extracted by the organic mixture. Note that the organic mixture extracted a substantial amount of the iron. Also note that the efficiency of extraction reached a point wherein it decreased with increasing iron concentrations in the aqueous solutions. Additional iron could have been extracted from those solutions with significant amounts of iron remaining by mixing them with a fresh mixture of tributyl phosphate and iso-butyl-heptyl ketone.

EXAMPLE II

Figure 2:
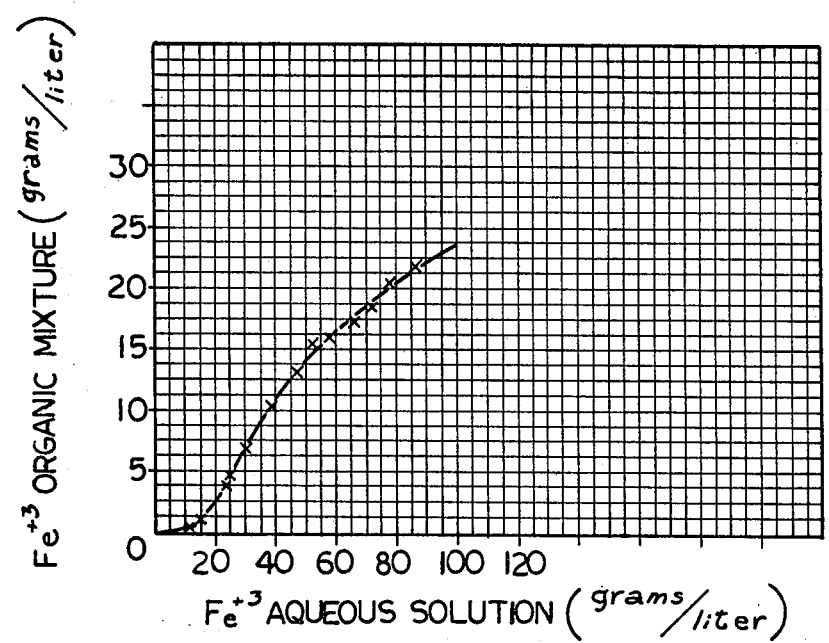
FIG. 2 is a plot of an equilibrium curve for $Fe^{+3}$ stripping from an organic mixture containing 40 volume % tributyl phosphate and 60 volume % iso-butyl-heptyl ketone.

Organic mixtures containing various concentrations of iron were mixed with water having a temperature of 40° C. and a low chloride ion concentration, in a ratio of 5 parts water to 1 part organic mixture to strip the iron therefrom. The organic mixture contained 40 volume % tributyl phosphate and 60 volume % iso-butyl-heptyl ketone, less iron and other extracted substances. The concentration of iron remaining in the organic mixture after stripping is shown in FIG. 2 along with the equilibrium concentration of iron stripped by the water. Note the high level of iron recovered. Additional iron could have been stripped from those organic mixtures with significant amounts of iron remaining by mixing them with a fresh batch of water.

EXAMPLE III

Aqueous solutions containing 120 gram/liter nickel and various amounts of cobalt and calcium were mixed with an organic mixture containing 40 volume % of an amine sold under the trademark ALAMINE 336 and 60 volume % iso-butyl-heptyl ketone, in a ratio of 5 parts aqueous solution to 1 part organic mixture to extract cobalt therefrom. The temperature and pH of the solution were respectively 40° C. and 0.6. The chloride ion concentration of the solution was initially 200 grams/liter. The concentration of cobalt remaining in the aqueous solution after mixing is shown in FIG. 3 along with the equilibrium concentration of cobalt extracted by the organic mixture. Note that the organic mixture extracted a substantial amount of the cobalt. Also note that the efficiency of extraction reached a point wherein it decreased with increasing cobalt concentration in the aqueous solutions. Additional cobalt could have been extracted from these solutions with significant amounts of cobalt remaining by mixing them with a fresh mixture of iso-butyl-heptyl ketone and said amine sold under the trademark ALAMINE 336.

EXAMPLE IV

Organic mixtures containing various concentrations of cobalt were mixed with water having a temperature of 40° C. and a low chloride ion concentration, in a ratio of 5 parts water to 1 part organic mixture to strip the cobalt therefrom. The organic mixture contained 40 volume % of said amine sold under the trademark ALAMINE 336 and 60 volume % iso-butyl-heptyl ketone, less cobalt and other extracted substances. The concentration of cobalt remaining in the organic mixture after stripping is shown in FIG. 4 along with the equilibrium concentration of cobalt stripped by the water. Note the high level of cobalt recovered. Additional cobalt could have been stripped from those organic mixtures with significant amounts of cobalt remaining by mixing them with a fresh batch of water.

EXAMPLE V

Aqueous solutions containing 30 grams/liter cobalt and a chloride iron concentration of 200 grams/liter were mixed with three different organic mixtures of ALAMINE 336 and iso-butyl-heptyl ketone to extract cobalt therefrom. The make-up of the organic mixtures is set forth hereinbelow in Table I.

TABLE I

| Organic Mixture | MAKE-UP (% BY VOLUME) | |
|---|---|---|
| | ALAMINE 336 | IBHK |
| I. | 25 | 75 |
| II. | 40 | 60 |
| III. | 60 | 40 |

The aqueous solutions were mixed with the organic mixtures in a ratio of 1:1. Resulting cobalt-bearing organic mixtures were separated from the aqueous solutions. Two additional mixing (extracting) and separating operations were performed in the same manner as the first.

The cobalt-bearing organic mixtures were subsequently mixed (washed) with water having a pH of 1.5, in a ratio of 1:1, to strip the cobalt therefrom. From 2 to 5 washes were used for each cobalt-bearing organic mixture. The amount of cobalt stripped from the mixtures is shown below in Table II.

TABLE II

| COBALT-BEARING ORGANIC MIXTURE | COBALT (grams/liter) | | | | | |
|---|---|---|---|---|---|---|
| | Wash 1 | 2 | 3 | 4 | 5 | Total |
| I. | 10.0 | 0.77 | — | — | — | 10.77 |
| II. | 14.0 | 2.3 | 0.285 | — | — | 16.585 |
| III. | 11.5 | 5.5 | 2.1 | 0.6 | .17 | 19.87 |

Table II shows that a significant amount of cobalt was recovered in accordance with the process of the present invention. The results were achieved through the use of an organic extracting agent and iso-butyl-heptyl ketone, and without the need for a third phase inhibitor.

It will be apparent to those skilled in the art that the novel principles of the invention disclosed herein in connection with specific examples thereof will support various other modifications and applications of the same. It is accordingly desired that in construing the breadth of the appended claims they shall not be limited to the specific examples of the invention described herein.

We claim:

1. In a process for separating cobalt from a pregnant liquor, which process includes the steps of: mixing said pregnant liquor with an organic mixture comprised of an organic amine and a diluent, said organic mixture being substantially insoluble in said pregnant liquor, said organic mixture absorbing said metallic value from said pregnant liquor; separating said organic mixture from said liquor; and stripping said metallic value from said organic mixture; the improvement comprising the steps of mixing said pregnant liquor with an organic amine and iso-butyl-heptyl ketone, said organic mixture having at least 10%, by volume, of iso-butyl-heptyl ketone.

2. A process according to claim 1, wherein said organic mixture has at least 30%, by volume, of iso-butyl-heptyl ketone.

* * * * *